Nov. 29, 1966 D. A. BUNGER 3,288,931

TAPERED SPRING REVERBERATION DELAY LINE DRIVE APPARATUS

Filed July 30, 1965

INVENTOR
DAVID A. BUNGER

William H. Breunig, Agent
BY Hurvitz & Rose

ATTORNEYS

United States Patent Office 3,288,931

Patented Nov. 29, 1966

3,288,931

TAPERED SPRING REVERBERATION DELAY LINE DRIVE APPARATUS

David A. Bunger, Cincinnati, Ohio, assignor to D. H. Baldwin Company, Cincinnati, Ohio, a corporation of Ohio Filed July 30, 1965, Ser. No. 476,138
6 Claims. (Cl. 179—1)

The present invention relates generally to reverberators, and more particularly to electronic circuitry for driving a reverberator in response to an audio band signal, for deriving the response of the reverberator, and for combining the unreverberated audio band signal with the response or reverberated audio band signal.

This application is a continuation in part of my prior application, Serial No. 397,482, filed September 18, 1964, entitled Tapered Spring Reverberation Delay Line, assigned to the assignee of the present invention (Patent No. 3,199,053).

The reverberator of U.S. Patent No. 3,199,053 relates to a tapered spring delay line which is provided with input and output transducers of the electromagnetic type, capable of inducing torsional vibrations in the delay line in response to an audio band signal, and of reproducing delayed and approximate replicas of the original audio band signal in response to torsional vibrations of the spring delay line.

The obvious necessity exists of including circuitry with any reverberator, and it is also usual to provide a facility for combining the reverberated and unreverberated audio band signal.

It is an object of the invention to provide simplified circuitry having minimum number of components, for driving a reverberator transducer, for deriving signal from a second reverberator transducer, and for combining the driving signal with the reverberated signal.

The above and still further objects, features and advantages of the present invention will become apparent upon consideration of the following detailed description of one specific embodiment thereof, especially when taken in conjunction with the accompanying drawing, wherein.

Figure 2:
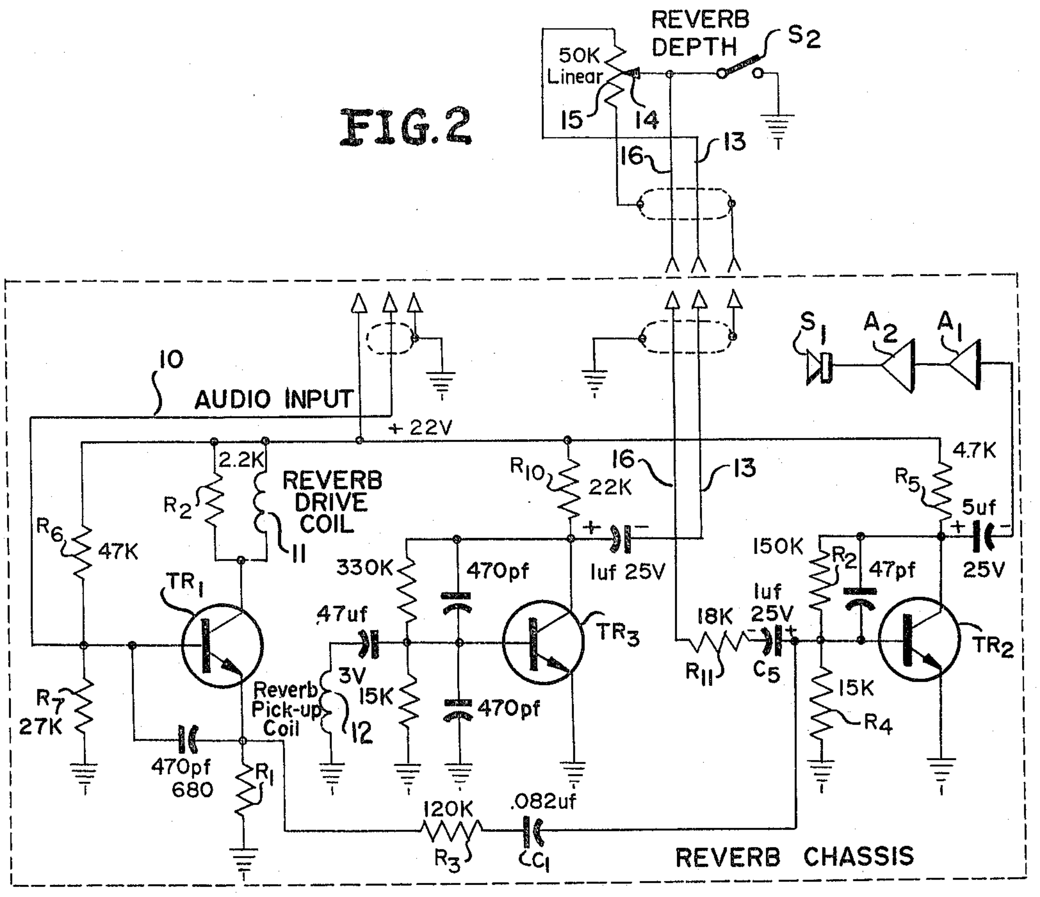
FIGURE 2 is a schematic circuit diagram of electronic circuitry associated with the transducers of the wire reverberator delay line of FIGURE 1.

In FIGURE 2, 10 is a lead supplying audio band signal. Lead 10 is connected to the base of a transistor $TR_1$, of the NPN type, and which has an emitter load consisting of a resistance $R_1$, and a collector load consisting of a reverberator drive coil 11, in parallel with a drain resistance $R_2$. The reverberator drive coil 11 is a current driven element. The current through the reverberator drive coil 11 is equal to the current through the emitter load resistance $R_1$, and cophasal therewith. The high D.C. voltage end of the drive coil 11 is essentially at A.C. ground. Looking back into the collector of $TR_1$, the coil 11 sees a very high impedance. Therefore the current in the coil is a directly proportional function of input signal, as is true for any constant current circuit. At the same time load resistance $R_1$ translates current variations into voltage variations, which are in strict proportion to the current variations.

The problem exists, that the impedance of drive coil 11 is a function of frequency. Since the drive circuit for the coil is a constant current circuit, this variation in impedance is not reflected as a variation of current as a function of frequency, for a given signal input voltage at the base of $TR_1$, but rather as a variation of voltage across the drive coil 11. As frequency increases, the increase of voltage across the drive coil 11 can become sufficient to drive $TR_1$ into a non-linear region, which introduces distortion. To avoid this eventuality, the resistance $R_2$, of suitably selected value, is connected in parallel with drive coil 11. The total voltage seen by the collector of $TR_1$, cannot then exceed that across $R_2$, which is not frequency sensitive. In effect, $R_2$ drains current increasingly from drive coil 11 as a function of frequency, as frequency increases. For low frequencies, $R_2$ represents an insignificant shunt, but for high audio frequencies becomes the more significant current path, recalling that the circuit is of the constant current type, so that the total current available must always divide between $R_2$ and driver coil 11.

The voltage across $R_1$ is applied to the base of transistor $TR_2$, via circuit consisting of a resistance $R_3$ and a series capacitor $C_1$. Capacitor $C_1$ has the function of blocking D.C. and the base of $TR_2$ being connected to ground via resistance $R_4$, $R_3$ is selected to attenuate the available signal to a suitable level. $TR_2$ is collector loaded by resistance $R_5$, and the voltage at the collector of $TR_2$ is supplied to a driver amplifier $A_1$ for a power amplifier $A_2$, which in turn drives a loud speaker $S_1$.

The resistances $R_6$, $R_7$ set the bias for the base of $TR_1$, as do the resistances $R_2$, $R_4$ for $TR_2$, and in this respect are conventional.

The numeral 12 denotes a pickup coil of a reverberator, and supplies signal to the base of transistor $TR_3$. The latter has a collector load $R_{10}$, and from the collector signal voltage proceeds via lead 13 to the high end of a potentiometer 15, which in turn provides signal via slide 14, lead 16, resistance $R_{11}$ and capacitor $C_5$ to the base of $TR_2$. Potentiometer 15 thus acts to control depth of reverberation, i.e. is a level control for reverberated signal. A switch $S_2$ enables grounding of slider 14, to eliminate all reverberated signal at will. Capacitor $C_5$ is a D.C. blocking capacitor, while $R_{11}$ sets the normal level of the reverberated signal, acting as a voltage divider.

In operation, an input audio signal band, on lead 10, causes transistor $TR_1$ to drive the reverberator drive coil 11, thus generating a mechanical audio signal on one end of the reverberator wire. The reverberator pickup transducer coil 12 translates mechanical vibration existing on the other end of the reverberator wire to audio signals. These drive $TR_3$, which in turn supplies signal via potentiometer 15 to summing transistor $TR_2$. The latter sums the reverberated signal with signal supplied directly from the emitter of $TR_1$. If desired, the reverberated signal may be eliminated by closing grounding switch $S_2$.

The drive coil 11 is always being driven, whether or not reverberated signal is transferred to speaker $S_1$. In this way, the character and level of the unreverberated signal does not change, when reverberated signal is eliminated.

The dive coil 11 has a resistance of 130Ω and an inductance of about 140 mh., so that equality of impedance as between resistance $R_2$ and coil 11 occurs at about 3 kc. The reverberator spring passes frequencies only to about 2 kc. although the drive coil itself operates over the entire audio band. Since the impedance of the drive coil at 2 kc. is about 1600Ω the resistance of $R_2$ does not exceed the impedance of coil 11 at any reverberated frequency. However, at high audio frequencies, $TR_1$ must provide a precise replica of the audio band at its emitter, i.e. across $R_1$. It is for the latter reason that the voltage across $R_1$ must not be allowed to overdrive transistor $TR_1$, i.e. must be limited, but the low cutoff frequency of the reverberator wire is the factor that permits the presence of resistance $R_2$, which robs normal driving current from coil 11 and is therefore frequency distortive.

While the present invention can be employed in conjunction with any wire reverberator which employs electromagnetic transducers, the system of the invention is intended for use with the reverberator of my Patent No. 3,199,053, hereinabove referred to.

Figure 1:
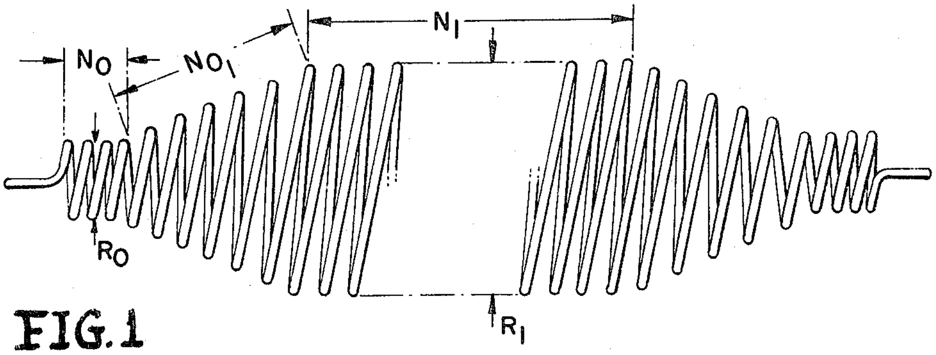
FIGURE 1 is a view in plan of a wire reverberator delay line, according to the invention.

Referring now to FIGURE 1 of the accompanying drawings, there is illustrated a tapered helical spring, accompanied by a symbolic designation which will be of aid in following the subsequent discussion of wave transmission properties. The spring preferably comprises a helically wound coil of, for example, 8 to 15 mil diameter beryllium copper, stainless steel or music wire. At either end thereof the helic radius is $R_0$ which is maintained constant for a number of turns $N_0$, after which the radius varies, in a uniformly tapering fashion in this case, over a number of turns $N_{01}$ to a larger radius $R_1$. Radius $R_1$ is constant for a centrally located number of turns $N_1$. The radii $R_0$ and $R_1$ will hereinafter be designated the minimum and maximum radii, respectively, of the helix, but it is also to be understood that this will refer to relative dimensions and not to limitations or restrictions on such dimensions. Further, in the limit, $N_0$ and $N_1$ may approach 1.

Torsional vibrations, or waves, impressed on one end of the spring are propagated over a portion of the spring length at a velocity $v_{tor}$, given by $$v_{tor}=\frac{a}{4\pi R^2}\left(\frac{E}{\rho}\right)^{1/2} \text{ turns/sec.} \quad (1)$$

where $a$ is a constant for any given spring, R is the radius of any one turn of the spring, E is Young's modlus of elasticity for the material of which the spring is made, and $\rho$ is the density of that material. If R is constant, then obviously $v_0$, where $$v_0=\frac{a}{4\pi R_0^2}\left(\frac{E}{\rho}\right)^{1/2} \text{ turns/sec.}$$

is constant for any given spring, independent of frequency of the propagated waves. I have found, however, that when the wavelength of the vibrations includes four turns of the spring along the tapered section, i.e. one turn of the spring encompassing $\lambda/4$, or 90°, of the signal cycle, one turn is of increased radius while an adjacent turn is decreased in radius, and above the frequency corresponding to this wavelength the motion is no longer strictly torsional. More specifically, above this frequency, the mode of propagation of the waves changes from torsional to transverse.

The frequency at which this mode transition occurs may be determined from Equation 1. Since $v=\lambda f$, and $\lambda=4$ turns of the spring at the frequency in question, then from Equation 1, $$f=\frac{a}{16\pi R^2}\left(\frac{E}{\rho}\right)^{1/2} \quad (2)$$

and the particular radius at which this occurs, hereinafter designated the break radius $R_B$ is, from Equation 2, $$R_B=\frac{1}{4}\left(\frac{a}{\pi f}\right)^{1/2}\left(\frac{E}{\rho}\right)^{1/4} \text{ cm.} \quad (3)$$

As is apparent from Equation 3, $R_B$ is a function of frequency, decreasing with increasing frequency. For transverse vibrations, or waves, the velocity of propagation along the spring is given by $$v_{trans}=\frac{1}{R}\left(\frac{fa}{\pi}\right)^{1/2}\left(\frac{E}{\rho}\right)^{1/4} \quad (4)$$

at $R_B$, the torsional velocity should equal the transverse velocity. Setting $$v_{tor}=v_{trans}$$

or $$\frac{a}{4\pi R^2}\left(\frac{E}{\rho}\right)^{1/2}=\frac{1}{R}\left(\frac{fa}{\pi}\right)^{1/2}\left(\frac{E}{\rho}\right)^{1/4}$$

which gives $$\frac{a}{4\pi R}=\left(\frac{fa}{\pi}\right)^{1/2}\left(\frac{\rho}{E}\right)^{1/4}$$

or $$R=\frac{1}{4}\left(\frac{a}{\pi f}\right)^{1/2}\left(\frac{E}{\rho}\right)^{1/4} \text{ cm.}$$

which agrees with the value for $R_B$ obtained in Equation 3.

For a linear variation in helix radius from $R_0$ to $R_1$, $$R_1=R_0+kN_{01}$$

where $k$ is the slope of the taper. Similarly, $$N_B=\frac{R_B-R_0}{k} \quad (5)$$

where $N_B$ is the number of the turn at which $R_B$ occurs. Since $$v=\frac{dn}{dt}$$

i.e. the rate of change of distance, measured in turns, with respect to time $t$, then, for the torsional mode the time delay is, from Equation 1, $$T_{tor}=\frac{4\pi}{a}\left(\frac{\rho}{E}\right)^{1/2}\int_0^{N_B R^2} dn$$

where $n=0$ is the turn having a radius $R_0$ at which the taper begins and $N_B$ has the value obtained in Equation 5. Evaluating the integral gives $$T_{tor}=\frac{4\pi}{3ka}\left(\frac{\rho}{E}\right)^{1/2}(R_B^3-R_0^3) \text{ sec.} \quad (6)$$

Similarly, for the minimum constant diameter $R_0$ length of spring, the integration over the appropriate limits is simply $$T_{tor}=\frac{4\pi R_0^2 N_0}{a}\left(\frac{\rho}{E}\right)^{1/2} \text{ sec.} \quad (7)$$

The total torsional time delay is, taking into account both ends of the spring, then $$T_{tor}=\frac{8\pi}{3ka}\left(\frac{\rho}{E}\right)^{1/2}[R_B^3-R_0^3+3kN_0R_0^2] \text{ sec.} \quad (8)$$

Using the same analysis to determine time delay in the transverse mode from Equation 4 gives $$T_{trans}=\frac{1}{2k}\left(\frac{\pi}{fa}\right)^{1/2}\left(\frac{\rho}{E}\right)^{1/4}[R_1^2-R_B^2] \text{ sec.} \quad (9)$$

for the spring portions between $R_B$ and $R_1$ at either end, and $$T_{trans}=N_1R_1\left(\frac{\pi}{fa}\right)^{1/2}\left(\frac{\rho}{E}\right)^{1/4} \text{ sec.} \quad (10)$$

for the spring length of radius $R_1$. The total transverse time delay is, doubling Equation 9 and combining with 10, $$T_{trans}=\frac{1}{k}\left(\frac{\pi}{fa}\right)\left(\frac{\rho}{E}\right)^{1/4}[R_1^2+2N_1R_1k-R_B^2] \text{ sec.} \quad (11)$$

The total time delay of the spring is then $$T_T=\frac{1}{k}\left(\frac{\pi}{fa}\right)^{1/2}\left(\frac{\rho}{E}\right)^{1/4}[R_1^2+2N_1R_1k-R_B^2]+\frac{8\pi}{3ka}\left(\frac{\rho}{E}\right)^{1/2}[R_B^3+3kN_0R_0^2-R_0^3] \text{ sec.} \quad (12)$$

It will be seen that the total time delay, $T_T$, is a function of frequency.

The effect of the tapered spring on wave motion is as follows. Vibrational waves are excited in the spring in a nondispersive mode, typically the torsional mode. At a particular helix radius, which differs for each frequency component of the complex wave along an increasing taper portion, the wave motion will undergo a transition from the non-dispersive to a dispersive mode, more specifically to the transverse mode. This mode transition radius is given by Equation 3, and as indicated, decreases with increasing wave frequency. Following the initial mode transition, the waves continue to propagate down the line in a transverse mode until a corresponding mode transition radius is encountered along a decreasing taper at which the wave motion, in accordance with its vibrational frequency, is converted back to the torsional mode. The result is that each wave component has a different delay time as a function of its frequency, as will be noted by reference to Equation 12. This result may similarly be viewed as a change in the effective length of the spring between mode transition radii for the various frequency components of the wave. Obviously, the spring may have several tapered portions rather than being tapered only at its end portions. Also, the taper may comprise a reduction in diameter from the ends toward the center of spring.

It will be recognized that the shape of the delay time versus wave frequency characteristic curve may be selected as desired for any spring by appropriate variation of the rate of taper, of $R_0$ and/or $R_1$ dimensions, or of the number of turns having an $R_0$ or $R_1$ radius. Delay time may alternatively be made a function of wave frequency by varying any of the parameters in Equation 3. Thus, for example, the wire radius of the spring may be altered over various portions of the spring, as opposed to varying the helix diameter, to produce results similar to those previously described. All of these variations and modifications are intended to be included within the scope of the present invention.

Figure 3:
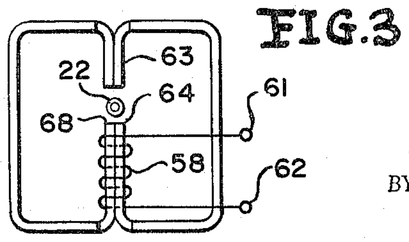
FIGURE 3 is a view in plan of a wire reverberator transducer.

FIGURE 3 more clearly illustrates the preferred transducer construction, for either the driver or the pickup. Core 60 is preferably of formed magnetic-lamination construction, notched in the four adjacent corners. Thus, legs 63, 64 are formed by the narrowed sections of the core structure, forming an air gap 68 into which annular ceramic permanent magnet 22 extends. Such construction is lower in cost than conventional "square-D" structure and provides reduced hum pickup.

A single coil 58 is wound about the magnetic core and terminates in a pair of terminals 61 and 62 to which appropriate electrical excitation or detection apparatus (not shown), respectively, may be operatively connected. For the driver transducer, for example, the winding is energized from an appropriate A.C. source and flux passes from magnetic paths of both side legs through gap 68, as illustrated, the flux alternating in accordance with the alternating character of the source output. Permanent magnet 22 oscillates in a torsional mode in response to the alternating flux passing through the gap to impress torsional waves at the oscillation frequency in spring 12.

To provide optimum coupling, and hence response, between tapered spring 12 and driver transducer 10 (or pickup transducer 20) the compliance and moment of inertia of the spring is arranged to equal the compliance and moment of inertia of the support wire and magnet.

Waves impressed upon the spring by the driver transducer travel, as hereinbefore explained, in the torsional mode of propagation until the break radius, $R_B$, at one end of the spring is reached, whereupon the waves are converted or translated to the transverse mode. In the transverse mode the components of the complex wave travel with a velocity proportional to their frequencies, and thus different time delays occur for the different components. Upon reaching the break radius, $R_B$, at the detection end of the spring, the vibrations undergo a transition back to the torsional mode and are subsequently detected at pickup transducer 20.

Each transducer is terminated in a known manner, as by impedance mismatch, to provide a rather large coefficient of reflection, for example, 80%, such that a portion of each wave, e.g. 20% in this example, is absorbed at the termination points and the larger portion, i.e. 80%, is reflected back along the spring.

The reflected portion of the wave propagates along the spring in the same manner as described above. The wave is repetitively detected each time it impinges upon the pickup transducer and is suitably converted to an electrical signal for subsequent conversation to audible sound. By virtue of such operation, each wave travels back and forth from one end of the spring to the other, the total travel time of each frequency component of each wave being governed by the predetermined reverberation time of the spring. The delay line which has been described is thus dispersive, i.e. time delay is frequency sensitive, over a portion of its length (between break radii), and non-dispersive, i.e. time delay is constant, over the remaining portions.

While I have described and illustrated one specific embodiment of my invention, it will be clear that variation of the details of construction which are specifically illustrated and described may be resorted to without departing from the true spirit and scope of the invention as defined in the appended claims.

What I claim is:

1. A driver amplifier for an audio frequency band electromagnetic transducer, comprising
- a transistor including a collector, a base and an emitter,
- a voltage supply point,
- a drive coil of said transducer,
- means connecting said drive coil intermediate said voltage supply point and said collector,
- means biasing said base to provide a sufficiently high resistance at said collector as seen by said drive coil to provide a constant current drive source for said drive coil,
- said drive coil having low impedance relative to said high resistance for all frequencies of said audio band,
- a resistance connected in shunt to said drive coil,
- said resistance having a value greater than the impedance of said drive coil at low audio frequencies and smaller than the impedance of said drive coil at high audio frequencies,
- said resistance having a value taken in parallel with the impedance of said drive coil such as to maintain said transistor operative in a substantially linear region over said audio frequency band.

2. The combination according to claim 1 wherein is further provided an unbypassed resistance connected between said emitter and a point of reference potential, and
- circuit means deriving an output signal from said emitter corresponding with a substantially undistorted version of said audio frequency band.

3. A reverberator system, comprising
- a reverberator having a drive coil and a pickup coil,
- a source of audio signal,
- a first transistor amplifier driving said drive coil
- a second transistor amplifier driven by said pickup coil,
- a third adding transistor amplifier responsive to said first and second transistor amplifiers to provide the sum of said audio signal with and without reverberation, wherein each of said amplifiers includes only one transistor, and wherein said first transistor amplifier includes said drive coil in its collector circuit, said first transistor amplifier further including an emitter load connected to said third adding transistor amplifier.

4. In an audio frequency band reverberation system,
- a wire coil mechanical reverberator,
- said reverberator including an electromagnetic driver having a driving coil and an electromagnetic mechanicoelectric transducer having a pickup coil,
- a first transistor having a first emitter, a first base and a first collector,
- a second transistor having a second emitter, base and collector;

a third transistor having a third emiter, base and collector, means connecting said drive coil in series with said first collector, means connecting an emitter load in series with said first emitter, means biasing said first base to provide operation of said first transistor as a constant current source for said driver coil, means connecting said pickup coil in series between the second base and second emitter, means coupling said first emitter to said third base, and means coupling said second collector to said third base, a loudspeaker, and amplifier means coupling said third collector to said loudspeaker.

5. The combination according to claim 4 wherein is provided a resistance in shunt to said drive coil having a value approximately equal to a midrange impedance of said drive coil, whereby to lower the voltage across said drive coil progressively as a function of frequency at least for higher frequencies of said audio frequency band.

6. In a system for providing a substantially undistorted version of a wide audio frequency band together with a frequency distorted version of a portion of said audio frequency band, a transistor having an emitter, a base and a collector, a voltage source, a drive coil connected between said voltage source and said collector, means biasing said base such that said collector looks like a constant current source to said drive coil, a bleed resistance connected across said drive coil to limit voltage excursions across said drive coil as frequency increases, whereby current in said drive coil is a frequency distorted replica of said audio frequency band, and a resistance load connected to said emitter, said resistance load having a voltage thereacross which is a substantial replica of said audio frequency band, the total current in said drive coil and said bleed resistance being a substantial replica of said audio frequency band.

No references cited.

KATHLEEN H. CLAFFY, *Primary Examiner.*

R. MURRAY, *Assistant Examiner.*